United States Patent
Nowak

[11] Patent Number: 6,060,813
[45] Date of Patent: May 9, 2000

[54] VIBRATION SUPPRESSION AND ELECTROMECHANICAL DAMPING APPARATUS FOR ELECTROPHOTOGRAPHIC PRINTING STRUCTURES

[75] Inventor: William J. Nowak, Webster, N.Y.

[73] Assignee: Xerox Corporation, Stamford, Conn.

[21] Appl. No.: 09/004,466

[22] Filed: Jan. 8, 1998

[51] Int. Cl.⁷ .................................................. H02N 2/00
[52] U.S. Cl. ........................................... 310/314; 310/326
[58] Field of Search .................................. 310/314, 316, 310/317, 319, 326, 338, 339

[56] References Cited

U.S. PATENT DOCUMENTS

| | | | |
|---|---|---|---|
| 3,325,580 | 6/1967 | Barcus et al. | 310/319 |
| 3,881,137 | 4/1975 | Thanawala | 317/53 |
| 4,021,762 | 5/1977 | Jaki | 310/319 |
| 4,158,787 | 6/1979 | Forward | 310/319 |
| 4,420,123 | 12/1983 | Fox et al. | 310/323 |
| 4,635,892 | 1/1987 | Baker | 248/550 |
| 4,672,839 | 6/1987 | Takeuchi et al. | 310/319 |
| 4,751,418 | 6/1988 | Murase | 310/319 |
| 4,825,773 | 5/1989 | Morishita et al. | 104/284 |
| 4,849,668 | 7/1989 | Crawley et al. | 310/328 |
| 5,096,541 | 3/1992 | Arnhold et al. | 162/199 |
| 5,155,523 | 10/1992 | Hara et al. | 355/53 |
| 5,168,673 | 12/1992 | Nemir et al. | 51/1 |
| 5,270,607 | 12/1993 | Terajima | 310/316 |
| 5,494,311 | 2/1996 | Blackburn et al. | 280/735 |
| 5,525,853 | 6/1996 | Nye et al. | 310/316 |
| 5,581,521 | 12/1996 | Nomura et al. | 369/32 |
| 5,635,787 | 6/1997 | Mori et al. | 310/316 |
| 5,783,898 | 7/1998 | Wu | 310/316 |
| 5,790,255 | 8/1998 | Jackson et al. | 356/375 |
| 5,834,650 | 11/1998 | Kim | 310/329 |
| 5,919,139 | 7/1999 | Lin | 600/443 |

FOREIGN PATENT DOCUMENTS 4-283957  10/1992  Japan ........................... H01L 41/08

*Primary Examiner*—Thomas M. Dougherty
*Attorney, Agent, or Firm*—Kevin R Kepner

[57] ABSTRACT

An apparatus for suppressing print quality degradation due to vibrations in a printing machine structure. The apparatus comprises a vibration member having a structural resonance, a transducer, and means for damping vibrations. The transducer is mounted to the vibration member and produces electrical signals corresponding to mechanical vibrations of the vibration member. The damping means is connected across the transducer and is responsive to the electrical signals.

20 Claims, 7 Drawing Sheets

VIBRATION SUPPRESSION AND ELECTROMECHANICAL DAMPING APPARATUS FOR ELECTROPHOTOGRAPHIC PRINTING STRUCTURES

This invention relates to suppressing vibrations and the damping thereof. More particularly, the present invention concerns electromechanical damping of structural vibrations in electrophotographic printing structures.

In a typical electrophotographic process, a portion of a photoconductive member is charged by a corona device to a substantially uniform potential to sensitize the surface thereof. The charged portion is then exposed to a light pattern of an original image to selectively discharge the surface in accordance with the light pattern. The resulting pattern of charged and discharged areas on the photoconductive member form an electrostatic charge pattern known as a latent image. The latent image is then developed by contacting it with a dry or liquid developer material having a carrier and toner. The toner is attracted to the image areas and held thereon by the electrostatic charge on the surface of the photoconductive member. Thus, a toner image is produced in conformity with a light pattern. The toner image is transferred to a copy media, and the image affixed thereto to form a permanent record of the image to be reproduced. Subsequent to development, excess toner left on the photoconductive member is cleaned from its surface. The process is useful for light lens copying from an original document or for printing copies of digitized originals with a raster output scanner (ROS), where a charged surface may be imagewise discharged in a variety of ways.

The foregoing discussion generally describes a typical or single color. The approach utilized for multicolor electrophotographic printing is substantially the same. However, instead of forming a single latent image on the photoconductive member, multiple latent images corresponding to different color separations are sequentially recorded on the photoconductive member. Each single color latent image is then developed with toner complimentary thereto. This process is repeated for each of the differently colored images with a respective toner of a complimentary color. Thereafter, each single color toner image is transferred to the copy media in superimposed registration with the prior toner image, creating a multi-layered toner image. This multi-layered toner image is permanently affixed to the copy media in a conventional manner to form a finished color copy.

Structural vibrations cause high image motion responses and print quality degradation in printers and copiers. In a black and white printing process, a source of structural image motion comes from the slow motion scan of the ROS beam relative to the photoreceptor module. Bands appear on the image as a result of raster lines being misplaced. Similarly, for single and multicolor processes, a print quality defect known as "rainbow banding" occurs as a result of poor sensitivity to pixel placement in a fast scan direction. In printers and copiers having many product scenarios derived from similar design architectures, excitation frequencies and amplitudes between product variants change the structural vibration characteristics. This causes costly changes in structural designs to eliminate the vibrations. A less expensive method of eliminating the vibrations comes, however, from bonding vibration sensing transducers on machine components and thereafter suppressing the vibrations with a devices designed to dissipate them. Recent developments in direct deposition piezoelectric copolymers have reduced the high cost of using piezoelectric transducers. Moreover, assembly costs associated with installing the transducers is reduced by spraying or flow coating the transducers onto machine components.

The following disclosures may relate to various aspects of the present invention.

---

U.S. Pat. No. 4,635,892
Patentee: Baker
Issue Date: January 13, 1987
U.S. Pat. No. 5,096,541
Patentee: Arnhold et al.
Issue Date: March 17, 1992
U.S. Pat. No. 5,155,523
Patentee: Hara et al.
Issue Date: October 13, 1992
U.S. Pat. No. 5,168,673
Patentee: Nemir et al.
Issue Date: December 8, 1992
U.S. Pat. No. 5,270,607
Patentee: Terajima
Issue Date: December 14, 1993

---

Portions of the foregoing disclosures may be briefly summarized as follows:

U.S. Pat. No. 4,635,892 to Baker discloses an active vibration suppresser for suppressing vibrations in a building structure. An actuator attached to the structure has an extendible rod attached to a seismic mass so that the seismic mass is turned by the actuator. A nearby sensor attached to the structure connects to a compensated power amplifier. The compensated power amplifier operates the actuator. Movement in the structure is detected by the sensor. This causes the amplifier to operate the actuator and move the seismic mass in a direction opposing the structural displacement to minimize the structural vibrations.

U.S. Pat. No. 5,096,541 to Arnhold et al. discloses a method for damping natural forms of vibrations that occur in a paper-making machine. The machine includes a damping mass connected thereto by a variable-force servo motor. Kinetic energies produced by vibrations in the machine or on parts thereof are detected and passed to a control unit as processed measurement signals. The control unit drives the servo motor and the damping mass in a direction that opposes the vibrations. A damper added to the servo motor can also reduce vibration energy. The damping force effected by the servo motor may be produced by a pressure medium, by piezoelectric crystals, or magnetostrictive elements.

U.S. Pat. No. 5,155,523 to Hara et al. discloses a workpiece supporting mechanism for use in an exposure apparatus. The mechanism prevents the degradation of precision formed patterns by suppressing vibrations on a workpiece and a workpiece support. The workpiece support is provided with a displacement sensor and a vibrator. Any vibration at the workpiece or the workpiece support is detected by the displacement sensor. In accordance with the detection, the vibrator energizes to cancel the vibration. A speed sensor or an acceleration sensor may serve as the displacement sensor. A piezoelectric device serves as the vibrator.

U.S. Pat. No. 5,168,673 to Nemir et al. discloses a method and apparatus for vibration damping in aircraft, watercraft, drilling platforms, space structures, civil structures, and other structures. Strain measurements are made on predetermined structural components within the structure. The magnitude of selected vectorial conditions in the structure are detected by sensors and the values thereof used to calculate modal energy of the structure. Thereafter, the stiffness of components selected from the predetermined structural components are changed dynamically to modify the modal energy of the structure.

U.S. Pat. No. 5,270,607 to Terajima discloses a vibration control apparatus for a gyro. The apparatus includes a vibratory member having a surface with a resonance point. A piezoelectric element mounted to the surface of the vibratory member is excited by an alternating current source through an impedance device. A feedback circuit connected between the piezoelectric element and the alternating current source serves to generate a control over the alternating current. When the piezoelectric element sustains mechanical deformation from the vibratory member, the piezoelectric effect produces a proportional electric field. An electric field applied thereto will likewise produce mechanical deformation. Consequently, when the alternating current is applied to the piezoelectric element, a voltage appears between the piezoelectric element and the impedance device. The voltage comprises the applied alternating current voltage and a voltage that accompanies the piezoelectric effect. The feedback circuit separates out the piezoelectric effect voltage and returns this voltage to the alternating current source to control the source.

In accordance with one aspect of the present invention, there is provided an apparatus for suppressing print quality degradation due to vibrations in a printing machine structure. The apparatus comprises a vibration member having a structural resonance, a transducer, and means for damping vibrations. The transducer is mounted to the vibration member and produces electrical signals proportional to mechanical vibrations of the vibration member across a frequency band on either side of the structural resonance. The damping means is connected across the transducer and is responsive to the electrical signals.

Pursuant to another aspect of the present invention, there is provided an apparatus for suppressing print quality degradation due to vibrations in a printing machine structure. The apparatus comprises a vibration member having a structural resonance. A first transducer and a second transducer are mounted to the vibration member. The first transducer produces a first set of electrical signals proportional to mechanical vibrations of the vibration member across a frequency band on either side of the structural resonance. A feedback circuit connected to the first transducer generates a second set of electrical signals responsive to the first set of electrical signals. The second set of electrical signals are fed to the second transducer and drive the second transducer to induce second mechanical vibrations in the vibration member. The second mechanical vibrations are 180 degrees out of phase with the first mentioned mechanical vibrations to suppress the first mechanical vibrations.

Other features of the present invention will become apparent as the following description proceeds and upon reference to the drawings, in which.

Figure 4:
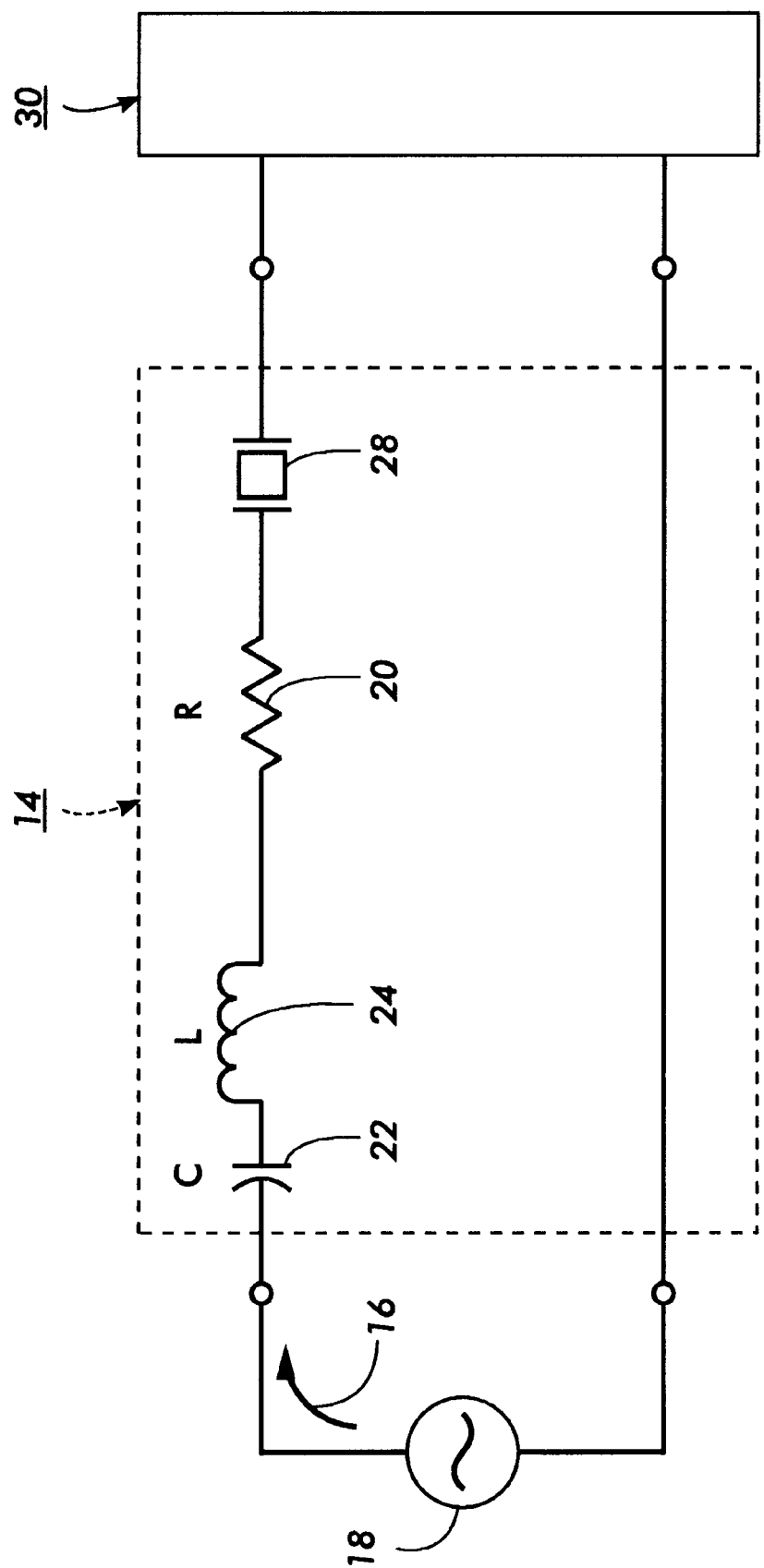
Figure 5:
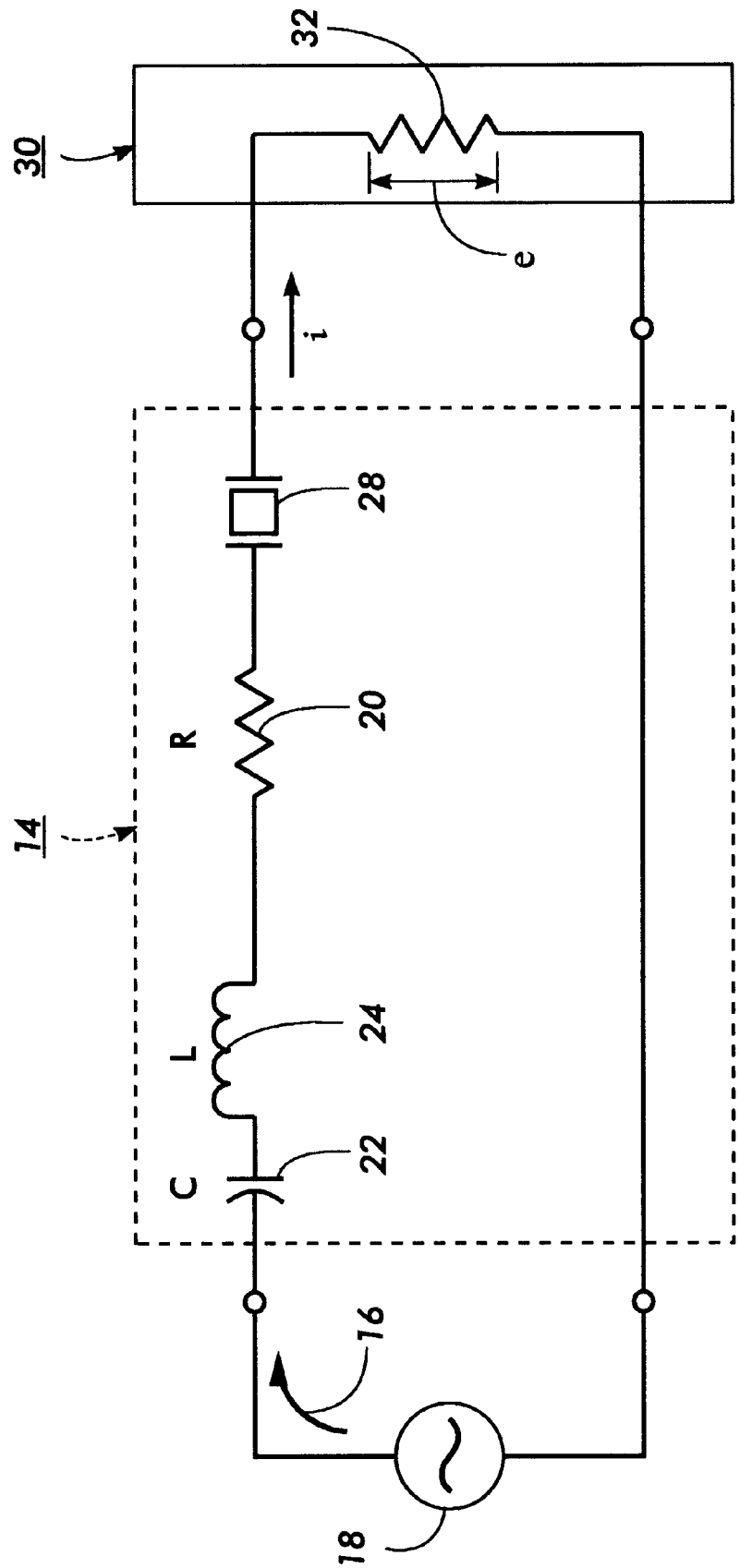
Figure 6:
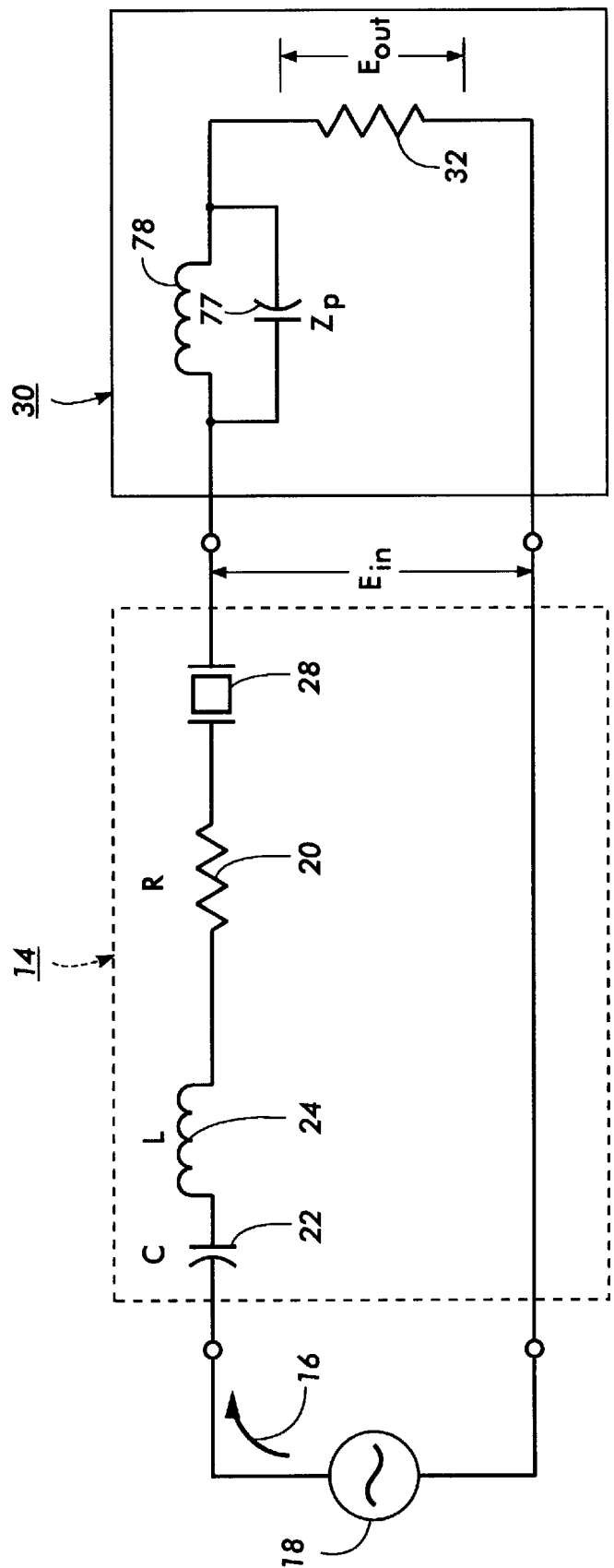
Figure 7:
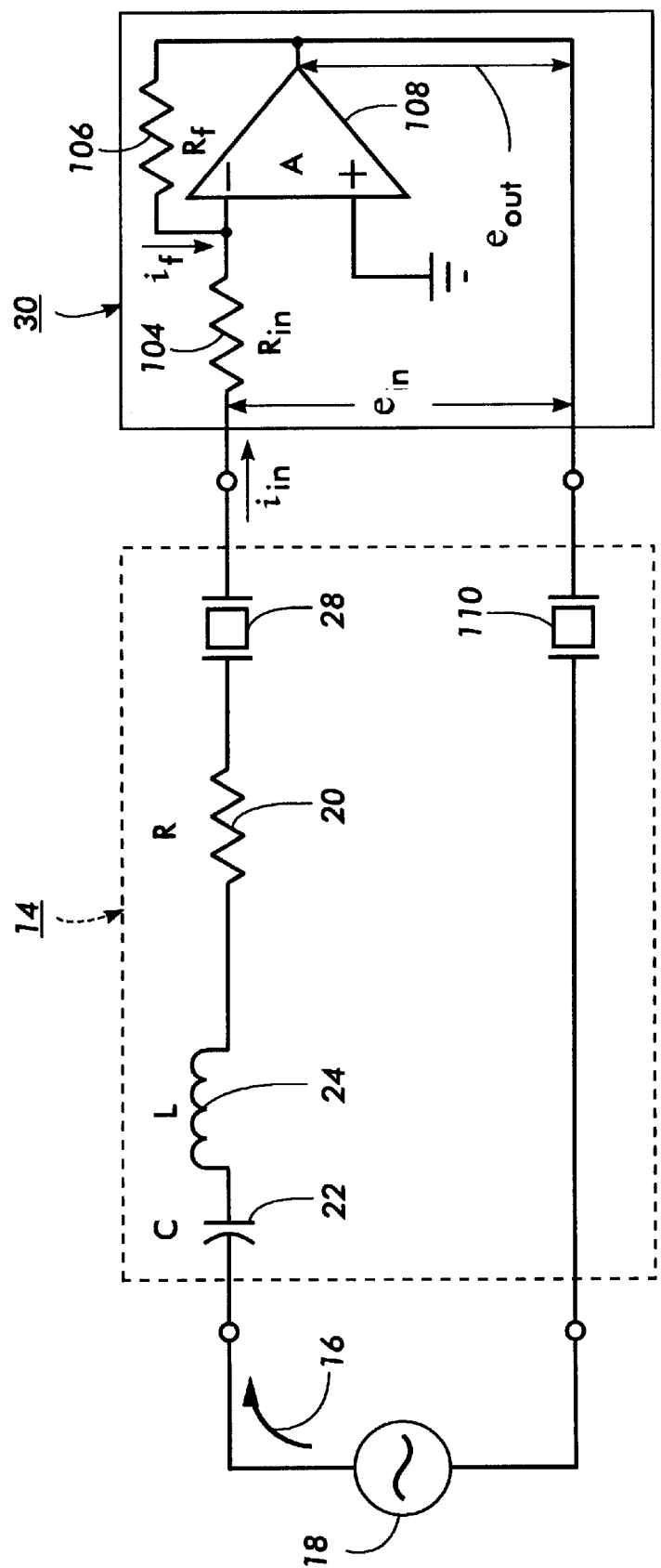

FIG. 4 schematically illustrates an electrically equivalent mechanical system having a structural vibration with an energy absorbing circuit coupled to a piezoelectric transducer;

FIG. 5 schematically illustrates the electrically equivalent mechanical system wherein the energy absorbing circuit has a resistive element that dissipates the vibration as heat energy;

FIG. 6 schematically illustrates the electrically equivalent mechanical system wherein the energy absorbing circuit has a parallel tuned circuit that filters out a specific vibration frequency; and FIG. 7 schematically illustrates the electrically equivalent mechanical system having a feedback circuit that attenuates vibration energies.

While the present invention will be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appended claims.

Figure 1:
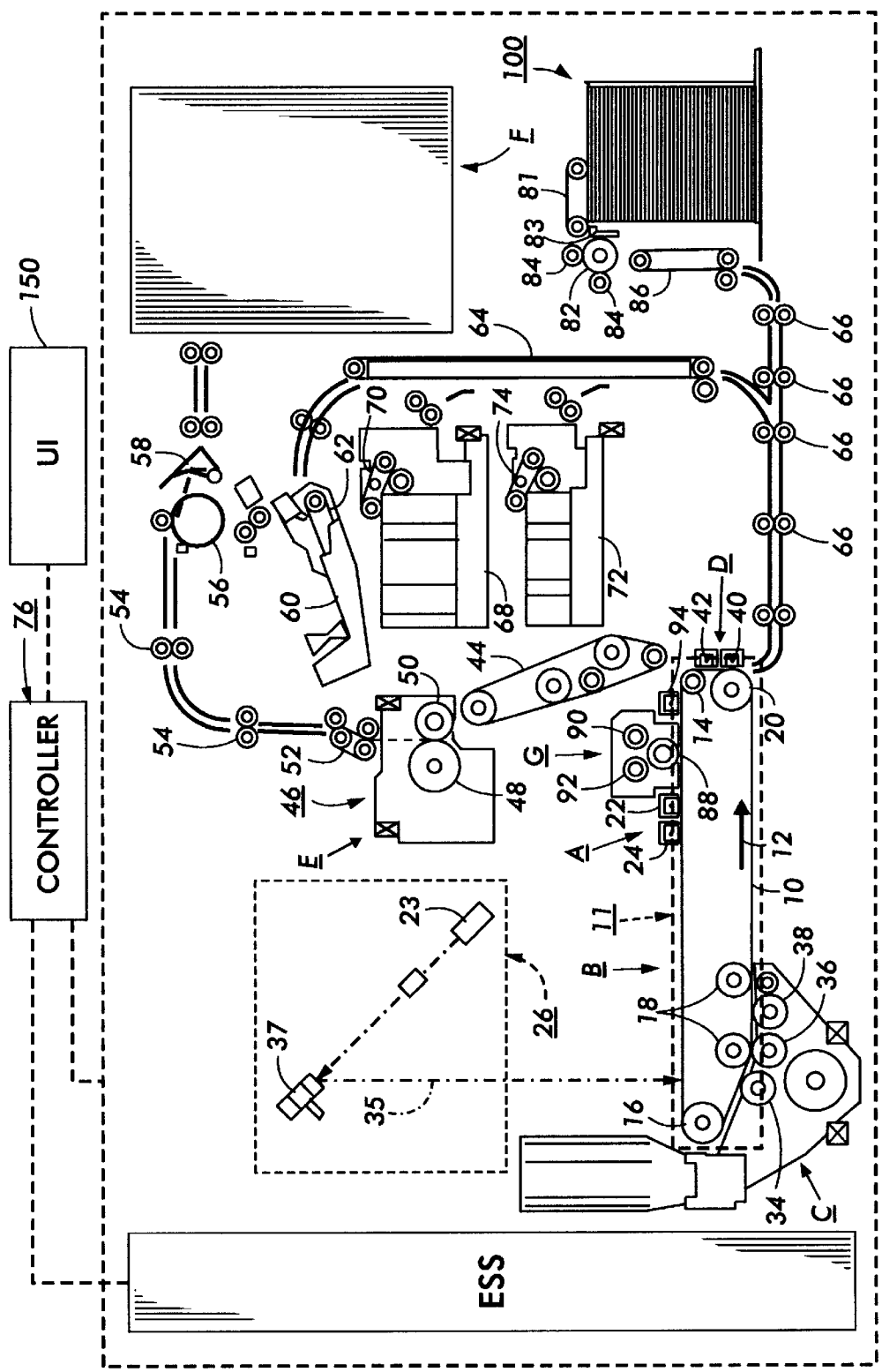
FIG. 1 is a schematic elevational view of a typical electrophotographic printing machine incorporating an apparatus according to the present invention.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the suppression and electromechanical damping of vibrations of the present invention may be employed in a wide variety of devices and is not specifically limited in its application to the particular embodiments depicted herein.

Referring to FIG. 1 of the drawings, the electrophotographic printing machine employs a photoconductive or an electro-receptive belt 10 mounted on a photoreceptor module 11. The preferred photoconductive belt will be described. The photoconductive belt 10 is made from a photoconductive material coated on a ground layer, which, in turn, is coated on an anti-curl backing layer. The photoconductive material is made from a transport layer coated on a selenium generator layer. The transport layer transports positive charges from the generator layer. The generator layer is coated on an interface layer. The interface layer is coated on the ground layer made from a titanium coated MYLAR™. The interface layer aids in the transfer of electrons to the ground layer. The ground layer is very thin and allows light to pass therethrough. Other suitable photoconductive materials, ground layers, and anti-curl backing layers may also be employed. Belt 10 moves in the direction of arrow 12 to advance successive portions sequentially through the various processing stations disposed about the path of movement thereof. Belt 10 is entrained about stripping roller 14, tensioning roller 16, idler rolls 18 and drive roller 20. Stripping roller 14 and idler rolls 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of the photoconductive surface is advanced through imaging station B. At the imaging station, an imaging module indicated generally by the reference numeral 26, records an electrostatic latent image on the photoconductive surface of the belt 10. Imaging module 26 includes a raster output scanner (ROS). The ROS lays out the electrostatic latent image in a series of horizontal scan lines with each line having a specified number of pixels per inch. Other types of imaging systems may also be used and, for example, include a pivoting or shiftable LED write bar, a projection LCD (liquid crystal display), or other electro-optic display as the "write" source.

Electrophotographic printing machines utilize digital electronics technology to produce output copies from original image information in the form of video data. In this case, it is known to use a raster output scanner (ROS) for exposing the charged portions of the photoconductive member to record the electrostatic latent image thereon. Generally, the ROS has a laser 23 for generating a collimated beam 35 of monochromatic radiation. The laser beam is modulated in conformance with the image information and is directed toward the surface of the photoconductive belt 10 through an optics system to form the desired image on the photoconductive belt. In the optics system, the modulated laser beam is reflected through a lens onto a scanning element, typically a rotating polygon 37 having mirrored facets such that the light beam is reflected from a facet and thereafter focused to a "spot" on the photoconductive belt 10. The rotation of the polygon 37 causes the spot to scan linearly across the photoconductive belt in a fast scan (i.e., scan line) direction. Meanwhile, the photoconductive belt 10 is advanced in a process direction (slow scan direction) orthogonal to the scan line direction. In this manner, the modulated laser beam is scanned across the recording medium in a raster scanning pattern. The light beam is intensity-modulated in accordance with an input image serial data stream at a rate such that individual picture elements ("pixels") of the image represented by the data stream are exposed on the photoconductive belt 10 to form the latent image. As a result of the ability to precisely control the ROS, the image can be exposed on the photoconductive belt in a varying number of positions lateral with respect to the process direction.

Figure 2:
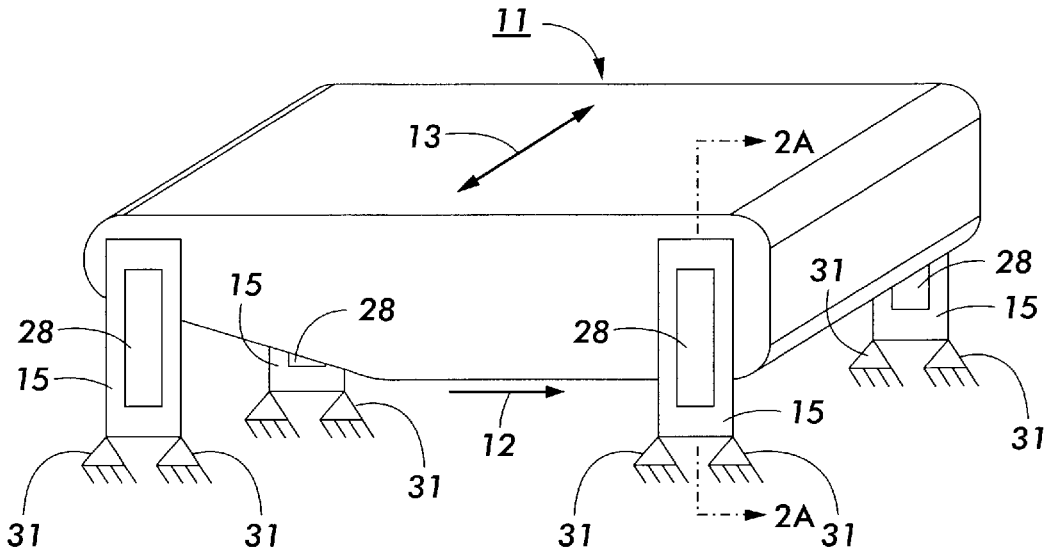
FIGS. 2 and 2A are, respectively, an elevational view of a photoreceptor module included in the printing machine of FIG. 1 and a sectional view thereof taken along the line A–A'.
Figure 2A:
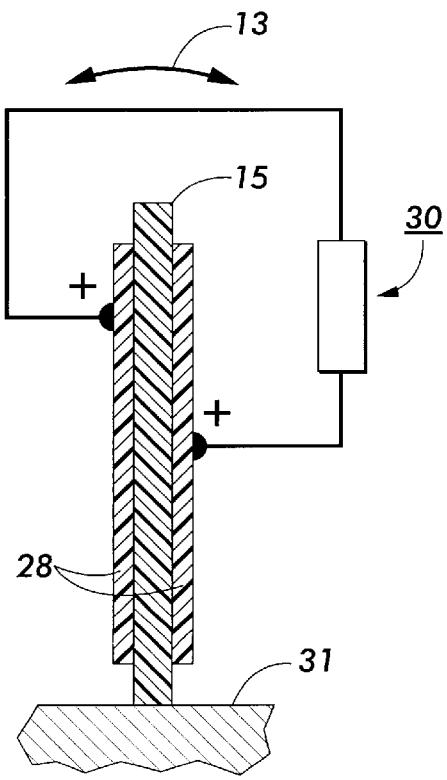

It has been found that the primary source of image motion is the slow scan motion of the ROS beam with respect to the photoconductive belt 10. Accordingly, FIGS. 2 and 2A illustrate a potential application for applying a vibration suppressing apparatus of the present invention to the structure of the photoreceptor module 11. As noted in FIGS. 2 and 2A, a motion indicated by arrow 13 exists on the module that is orthogonal to the process direction shown by arrow 12. Module 11 mounts to a plurality of mounting brackets 15 that mechanically connect to machine frame grounding points 31. Each mounting bracket 15 has two piezoelectric transducers 28 mounted thereto, one respectively to each side of the bracket. The polarized "+" electrode, as shown on FIG. 2A, of each piezoelectric transducer 28 faces outward and connects to an energy absorbing circuit 30. The motion sensed by transducers 28 is dissipated by circuit 30.

Figure 3:
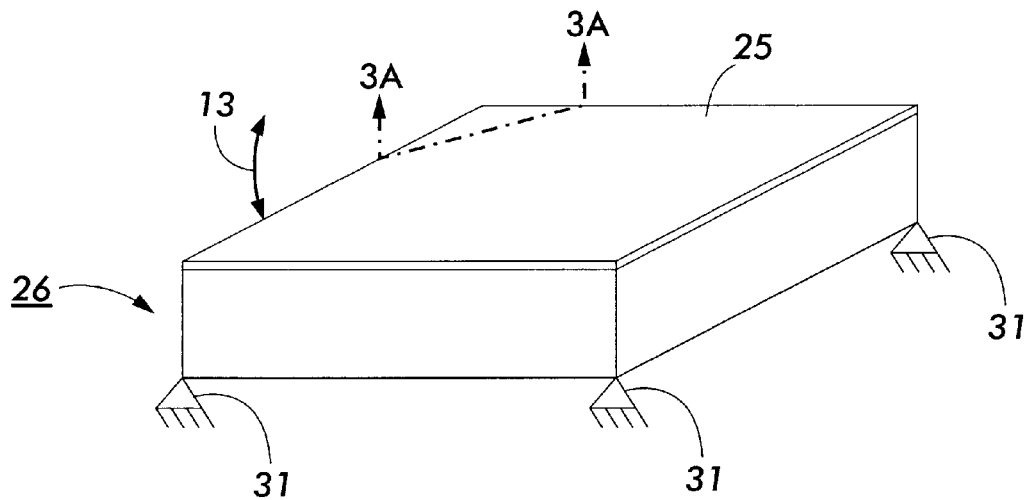
FIGS. 3 and 3A are, respectively, an elevational view of a ROS module included in the printing machine of FIG. 1 and a sectional view thereof taken along the line B–B'.
Figure 3A:
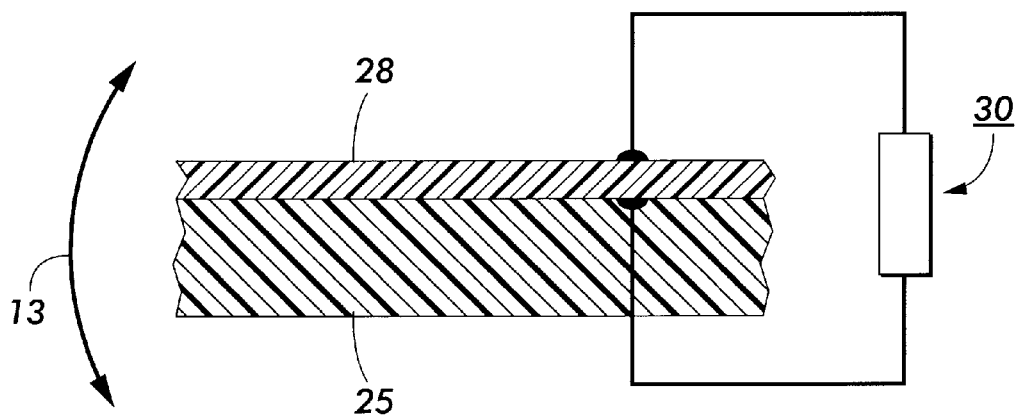

Similarly, FIGS. 3 and 3A illustrate another application for applying the vibration suppressing apparatus of the present invention to the imaging module 26. Module 26 mechanically mounts the machine frame through a plurality of grounding points 31. As noted in FIGS. 3 and 3A, a vibration indicated by arrow 13 exists on module 26 in a vertical direction. A piezoelectric transducer 28 bonded to cover 25, shown in FIG. 3A, senses the vibration and an energy absorbing circuit 30 dissipates the sensed vibration. The motional arms of the vibrating structures shown in FIGS. 2 and 3 and the dissipating components in circuit 30 will be discussed hereinafter with reference to FIG. 4 through FIG. 7.

Returning to FIG. 1, belt 10 advances the electrostatic latent image recorded thereon to development station C.

Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. A magnetic roll, positioned after developer roll 38, in the direction of arrow 12 is a carrier granule removal device adapted to remove any carrier granules adhering to belt 10. Thus, rolls 34 and 36 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to light emitted by a pretransfer lamp (not shown) to reduce the attraction between photoconductive belt 10 and the toner powder image. Next, a corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove the curl. Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. The sheets are attached to one another by either a binder or a stapler. Duplex tray 60 provides an intermediate or buffer storage for those sheets that have been printed on one side and on which an image will be subsequently printed on the opposite side thereof. The sheets are stacked in duplex tray 60 face down on top of one another in the order in which they are copied.

In order to complete duplex copying, the sheets in tray 60 are fed back, in seriatim, by bottom feeder 62 to transfer station D by conveyor 64 and rollers 66 for transfer of the toner powder image to the opposed sides of the copy sheets. Inasmuch as successive bottom sheets are fed from duplex tray 60, the clean side of the copy sheet is positioned in contact with belt 10 at transfer station D so that the toner powder image is transferred thereto. The duplex sheet is then fed through the same path as described with reference to finishing station F.

Copy sheets are fed to transfer station D from a secondary tray 68. The secondary tray 68 includes an elevator driven by a bi-directional motor. Its controller has the ability to drive the tray up or down. When the tray is in the down position, stacks of copy sheets are loaded and unloaded. In the up position, successive copy sheets may be fed therefrom by sheet feeder 70. Sheet feeder 70 is a friction retard feeder utilizing a feed belt and take-away rolls to advance successive copy sheets to transport 64 which advances the sheets to rolls 66 and then to transfer station D.

Copy sheets may also be fed to transfer station D from an auxiliary tray 72. The auxiliary tray 72 includes an elevator driven by a directional motor. Its controller has the ability to drive the tray up or down. When the tray is in the down position, stacks of copy sheets are loaded or unloaded therefrom. In the up position, successive copy sheets may be fed therefrom by sheet feeder 74. Sheet feeder 74 is a friction retard feeder utilizing a feed belt and take-away rolls to advance successive copy sheets to transport 64 which advances the sheets to rolls 66 and then to transfer station D.

Secondary tray 68 and auxiliary tray 72 are secondary sources of copy sheets. A high capacity variable sheet size sheet feeder indicated by the reference numeral 100 is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station D.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, a pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88. A reclaim roll 90 is electrically biased negatively relative to the cleaner brush 88 to remove toner particles therefrom. A waste roll 92 is electrically biased positively relative to the reclaim roll 90 so as to remove paper debris and negatively charged toner particles. The toner particles on the reclaim roll 90 are scraped off and deposited in a reclaim auger (not shown), where it is transported out of the rear of cleaning station G.

The various machine functions are regulated by a controller 76. The controller 76 is preferably a programmable microprocessor which controls all of the machine functions hereinbefore described. The controller provides, for example, a comparison count of the copy sheets, the number of documents recirculated, the number of copy sheets selected by the operator, time delays, and jam corrections. The control of all of the systems heretofore described are accomplished by conventional inputs from a user interface (UI) 150.

Turning now to FIG. 4, there is shown schematically an electrical equivalent circuit 14 of a mechanical structure having a structural resonance. FIG. 4 depicts the photoreceptor module 11 or the imaging module 26 described in FIG. 1. Electrically, these vibrating structures can be represented by a series combination of an inductor (L) 24, a capacitor (C) 22, and a resistor (R) 20. They are the primary, or motional components that determine the mechanical resonance of circuit 14. Inductor (L) 24 represents the system mass which is acted upon by a driving force. Capacitor (C) 22 is a structural compliance or the linear displacement produced in the vibrating system and resistor (R) 20 represents the restoring force per unit displacement.

Circuit 14 has a single resonant frequency that is bounded by off resonant frequencies. This range of frequencies is called the frequency response envelope of the circuit. The circuit is further excited by an external, oscillatory driving force having a frequency equal to any frequency in the frequency response envelope. It is shown as an alternating current (a-c) source 18 having a displacement velocity depicted by arrow 16. According to the present invention, a piezoelectric transducer 28 is mounted on circuit 14 to sense vibrations therein. Because of the piezoelectric property of transducer 28, the application of an electric field impressed thereon causes the transducer to oscillate. Conversely, a mechanical force or vibration applied to transducer 28 causes it to generate an electric field. Typically, transducer 28 is responsive to a-c electric fields and mechanical vibrations in the range of approximately 1 to 1000 cycles per second (hertz). This range is commonly referred to as the "band-pass" response, where 1 hertz is the lower frequency cutoff and 1000 hertz is the upper frequency cutoff. The transducer 28 may be bonded or directly deposited to circuit 14. It may be a PZT ceramic, a piezo sensitive material like PVDF, or a piezo sensitive copolymer such as $PVF_2$ and $PVF_3$. An energy absorbing circuit 30 connected to transducer 28 contains components therein to reduce the vibrations detected by transducer 28.

FIG. 5 shows a first embodiment of the energy absorber 30 wherein, a resistor 32 dissipates the vibration energy of all vibration frequencies including resonant and off resonant frequencies. Here, transducer 28 generates an a-c current i equal in frequency to the mechanical vibration. The current i flows through resistor 32 to produce a voltage potential e. The power dissipated in resistor 32 is equivalent the voltage potential e across resistor 32 while current i flows through it. This power is dissipated in the form of heat energy.

FIG. 6 illustrates a second embodiment of the energy absorber circuit 30 having a filter network therein to attenuate a vibration frequency of interest. A capacitor (C) 77 and an inductor (L) 78 form a parallel resonant circuit. They work to reject a specific vibration frequency without affecting the response of circuit 30 to other frequencies. Inductor 78 and capacitor 77 are tuned to a vibration frequency (f) of transducer 28 given by:

$$f = 1/2\pi\sqrt{LC} \text{ Hertz}$$

where

L is the value of the inductor 78 in henries, and

C is the value of the capacitor 77 in farads.

Moreover, inductor 78 and capacitor 77 are connected in series with resistor 32 to form a voltage divider, wherein the voltage $E_{out}$ across resistor 32 will be:

$$E_{out} = E_{in}(R_{32}/R_{32} + Z_p)$$

where $E_{in}$ is the voltage from transducer 28;

$Z_p$ is the impedance of the parallel circuit at resonance; and $R_{32}$ is the resistance of resistor 32.

One skilled in the art will recognize that at resonance, the impedance $Z_p$ of the parallel circuit will be many times greater than the resistance of resistor 32. This results in a very small voltage $E_{out}$ across resistor 32 at this frequency. At frequencies off resonance, $Z_p$ becomes quite small, and therefore, the voltage $E_{out}$ across resistor 32 approaches 100 percent of the input voltage $E_{in}$ from transducer 28. In effect a notch is formed in the band-pass response of transducer 28. It traps the frequency tuned to by inductor 78 and capacitor 77 and prevents the passage thereof.

FIG. 7 shows a third embodiment of the energy absorber 30 wherein, a feedback amplifier 108 suppresses the vibration energy. The amplifier 108 produces an electrical signal that is of equal frequency and amplitude, but 180 degrees out of phase with the electrical signal provided by transducer 28. The out-of-phase signal from amplifier 108 electrically drives a second piezoelectric transducer 110 mounted on circuit 14. The second piezoelectric transducer 110 converts the electrical signal impressed thereon into a mechanical vibration that is proportional to the electrical force applied to it. Since the mechanical vibration is of equal frequency and amplitude, but 180 degrees out of phase with the driving force from the a-c source 18, the two vibrations additively cancel each other.

The feedback amplifier 108 comprises an inverting operational amplifier having both an inverting (−) input and a non-inverting (+) input. The (+) input is connected to ground and the input signal $e_{in}$ from transducer 28 is applied to the (−) input through a resistor 104. A feedback voltage $e_{out}$ is returned from the output of amplifier 108 through a feedback resistor 106. It is a known characteristic of the inverting operational amplifier that the output voltage $e_{out}$ appearing across resistor 106 is negative (180 degrees out of phase with $e_{in}$) due to a sign inversion in the amplifier. Furthermore, since it is also a characteristic of the inverting operational amplifier that the input current $i_{in}$ and feedback current $i_f$ are equal, the characteristic gain A of the inverting operational amplifier, in terms of $e_{out}$ and $e_{in}$, is:

$$e_{out}/e_{in} = -R_f/R_{in}$$

where $R_f$ is resistor 106, and $R_{in}$ is resistor 104.

Thus, the gain A of amplifier 108 can be varied by adjusting either resistor 106 or resistor 104. If resistor 106 is varied from zero to infinity, the gain of amplifier 108 will also vary from zero to infinity since the gain A is proportional to resistor 106. In the application of the present invention, however, the gain A of amplifier 108 is set to unity (A=1) by making resistors 104 and 106 equal in value.

While the invention herein has been described in the context of suppressing and electromechanically damping vibrations in the ROS and photoreceptor modules of a printing machine, it will be readily apparent that vibration suppression and electromechanical damping can be utilized to reduce vibrations in other printing machine components. Likely candidates include the machine frame side plates, back plates, base pan, and other structural components between the ROS and photoreceptor that indirectly contribute to structural motion.

It is, therefore, apparent that there has been provided in accordance with the present invention an apparatus for suppressing and damping vibrations in a printing machine that fully satisfies the aims and advantages hereinbefore set forth. While this invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An apparatus for suppressing print quality degradation due to vibrations in a printing machine structure, comprising:
    a vibration member having a structural resonance, wherein said vibration member comprises a structural portion of an imaging device;
    a transducer mounted to said vibration member for producing electrical signals corresponding to mechanical vibrations of said vibration member across a frequency band on either side of the structural resonance; and
    damping means connected to said transducer, said damping means responsive to said electrical signals.

2. An apparatus according to claim 1, wherein said damping means comprises a resistor connected across said transducer.

3. An apparatus according to claim 2, wherein said resistor dissipates the vibrations as heat energy.

4. An apparatus according to claim 1, wherein said damping means comprises:
    a capacitor connected across said transducer; and
    an inductor connected in parallel with said capacitor to form a tuned L-C circuit having a resonant frequency substantially equal to the structural resonance of said vibration member; and
    a resistor connected in series with said L-C circuit.

5. An apparatus according to claim 4, wherein said L-C circuit and said resistor form a voltage divider that attenuates the vibrations.

6. An apparatus according to claim 1, wherein said transducer is responsive to a frequency band of approximately 1 to 1000 hertz.

7. An apparatus according to claim 1, wherein said transducer is a piezoelectric transducer.

8. An apparatus according to claim 1, wherein said transducer is bonded to said vibration member.

9. An apparatus according to claim 1, wherein said transducer is directly deposited on said vibration member.

10. An apparatus for suppressing print quality degradation due to vibrations in a printing machine structure, comprising:
    a vibration member having a structural resonance, wherein said vibration member comprises a structural portion of an imaging device;
    a first transducer mounted to said vibration member for producing a first set of electrical signals corresponding to mechanical vibrations of said vibration member across a frequency band on either side of the structural resonance;
    a second transducer mounted to said vibration member; and
    a feedback circuit connected to said first transducer, said feedback circuit generating a second set of electrical signals responsive to said first set of electrical signals, feeding said second set of electrical signals to said second transducer to drive said second transducer to induce second mechanical vibrations in said vibration member that are 180 degrees out of phase with said first mentioned mechanical vibrations to suppress said first mentioned mechanical vibrations.

11. An apparatus for suppressing print quality degradation due to vibrations in a printing machine structure, comprising:

a vibration member having a structural resonance;

a first transducer mounted to said vibration member for producing a first set of electrical signals corresponding to mechanical vibrations of said vibration member across a frequency band on either side of the structural resonance;

a second transducer mounted to said vibration member; and a feedback circuit connected to said first transducer, said feedback circuit generating a second set of electrical signals responsive to said first set of electrical signals, feeding said second set of electrical signals to said second transducer to drive said second transducer to induce second mechanical vibrations in said vibration member that are 180 degrees out of phase with said first mentioned mechanical vibrations to suppress said first mentioned mechanical vibrations, wherein said feedback circuit comprises an operational amplifier having an inverting input and a non-inverting input and an output, said non-inverting input being connected to ground, a first resistor having a first termination and a second termination, said first termination of said first resistor being connected to said inverting input, means for connecting said first mentioned transducer between said second termination of said resistor and said non-inverting input, a second resistor having a first termination and a second termination, said first termination of said second resistor being connected to said output and said second termination of said second resistor being connected to said inverting input, means for connecting said second transducer to said output wherein said operational amplifier and resistors having parameters selected so that, when said second transducer is connected to said output by said connecting means, said operational amplifier generates said second electrical signals out of phase with said first mentioned electrical signals and proportional to a ratio of said second resistor to said first resistor.

12. An apparatus according to claim 10, wherein said first transducer is responsive to a frequency band of approximately 1 to 1000 hertz.

13. An apparatus according to claim 10, wherein said second transducer is responsive to a frequency band of approximately 1 to 1000 hertz.

14. An apparatus according to claim 10, wherein said first transducer is a piezoelectric transducer.

15. An apparatus according to claim 10, wherein said first transducer is bonded to said vibration member.

16. An apparatus according to claim 10, wherein said first transducer is directly deposited on said vibration member.

17. An apparatus according to claim 10, wherein said second transducer is a piezoelectric transducer.

18. An apparatus according to claim 10, wherein said second transducer is bonded to said vibration member.

19. An apparatus according to claim 10, wherein said second transducer is directly deposited on said vibration member.

20. An apparatus according to claim 11, wherein said operational amplifier has unity gain.

* * * * *